United States Patent [19]

Pratt, Jr.

[11] 4,174,064
[45] Nov. 13, 1979

[54] ENERGY CONTROL SYSTEM PROVIDING SELECTIVE CONTROL OF REMOTE ZONE HEATING OR COOLING FROM A CENTRAL LOCATION

[75] Inventor: Fred Pratt, Jr., Humboldt, Tenn.
[73] Assignee: Teleci, Inc., Jackson, Tenn.
[21] Appl. No.: 864,494
[22] Filed: Dec. 27, 1977
[51] Int. Cl.² ............... G05D 23/19; H04M 11/00
[52] U.S. Cl. ............................ 236/1 B; 179/2 A; 236/51; 307/41; 340/147 R
[58] Field of Search ............ 236/51, 46 R, 1 B; 179/2 A; 340/147 R, 310 A; 165/11; 307/41

[56] References Cited

U.S. PATENT DOCUMENTS

| | | | |
|---|---|---|---|
| 4,021,615 | 5/1977 | James et al. | 340/147 R |
| 4,064,485 | 12/1977 | Leyde | 340/147 R |
| 4,077,566 | 3/1978 | Bradford | 165/16 |

Primary Examiner—William E. Wayner
Attorney, Agent, or Firm—Kalish & Gilster

[57] ABSTRACT

An energy control system for selectively controlling permissible temperature ranges in a plurality of remote zones from a central control location where the zones each have a heat transfer unit for controlling temperature in the zone. The system is intended for use where the zones are interconnected by pairs of conductors, preferably telephone circuits, with the control location. The system includes a switching arrangement for selectively controlling voltages on the conductors, as by reversing the polarity of normal DC voltage across a conductor pair. Voltage responsive circuits at each zone are interconnected with such conductors. Heat transfer control switching circuits in each zone are associated with the voltages responsive circuits for altering normal operation of the heat transfer unit in the zone in response to a detected change in voltage on the conductor by the voltage responsive circuit. Operation is altered, as by shutting off the heat transfer unit, in a sense tending to require less energy for heating or cooling the zone thereby conserving energy.

23 Claims, 8 Drawing Figures

ENERGY CONTROL SYSTEM PROVIDING SELECTIVE CONTROL OF REMOTE ZONE HEATING OR COOLING FROM A CENTRAL LOCATION

BACKGROUND OF THE INVENTION

This invention relates to temperature control systems and, more particularly, to a system for selectively controlling permissible temperature ranges in each of a plurality of remote zones from a control location for the purpose of conserving energy by controlling heating or cooling in such remote zones.

It is, of course, known that the amount of energy utilized for transferring heat to a house or other zone such as an area or room within a larger structure can be conserved if the temperature is permitted to vary over a greater range in response to external environmental considerations. For example, if heating is not employed until the temperature drops to 50° F. (10° C.) or, by the same token, if air conditioning is not employed until the temperature in a zone reaches some upper limit, such as 85° F. (29.4° C.), much less energy will be consumed than would be the case if the temperature were permitted to vary only about a much narrower range such as from 65° F. (18.3° C.) to 74° F. (23.3° C.) through transfer of heat to or from the zone. Temperature is quite often permitted to vary only in a rather narrow range such as the latter.

It will be immediately recognized that it is the usual practice in both domestic and commercial areas to permit the temperature rarely to fall below relatively warm temperatures such as 65° F. (18.3° C.) or even 70° F. (31.1° C.), for example. On the other hand, it is conventional practice to employ air conditioning for cooling dwellings and commercial areas when the temperature rises only slightly above that which is considered warm.

Needless to say, the overriding humanist and self-survival considerations of conserving energy in view of the now well recognized shortage of available sources of energy clearly mandate that worldwide efforts to conserve energy be accelerated and implemented whenever and wherever possible. Thus, where a zone or dwelling is to be unoccupied over a considerable period of time, energy should not be utilized wastefully and needlessly for maintaining the temperature in such zone or dwelling within a narrow range of temperatures. For example, in a hotel or motel or other commercial building where a room or other zone is unoccupied, it is desirable to permit the temperature in the zone to fall to a quite low value such as 50° F. in the winter and to permit rise in the temperature during a warm season, to a very high temperature, such as 85° F. since such extremes of temperatures are unlikely to cause damage to inanimate objects within such zone and will cause only trivial discomfort to a person who may enter or transit the zone for a brief period, such as maintenance employees.

Yet, it is desirable when there is occupancy of such zone to permit a more modest temperature variation, i.e., over a range of temperatures not so extreme as to cause great discomfort to occupants. But even where the zone is to be occupied, it may be desirable to prevent heating or cooling when temperatures are within a band or range which is reasonably tolerable to the occupants. Consequently, it may be desirable to place limits on the temperature which can be maintained by energy-consumptive heat transfer such as by operating a furnace or airconditioner for the purposes of either cooling or heating. Even where such limits are imposed, it may nevertheless be desirable to permit occupants to exercise a degree of control over temperatures in the zone, so long as the limits are not exceeded.

It is known to provide adjustable or multiple functional thermostat switches which are clock-controlled so that different thermostats govern temperature regulation at differing times of the day. Remote operation of thermostats has also been proposed utilizing radio or dedicated circuit signalling. It is possible also to manually vary the temperature setting of such thermostats or manually select alternate theremostats so as to provide for permitting variation of temperature over a greater range when a zone is unoccupied. However, it must be recognized that in a commercial establishment such as a motel or hotel in which there are many rooms, and perhaps even hundreds or thousands of rooms, it is most inconvenient and as a commercial matter economically impractical to manually vary permissible temperature ranges by adjustment, for example, of the thermostats in each room by maintenance personnel or the like when a zone becomes unoccupied, as where a guest checks out of a room.

While a hotel or motel room cleaning person can manually change a room thermostat when the room is cleaned after a guest checks out, resetting a conventional thermostat may permit only a modest energy saving. Moreover, energy wasting cooling and/or heating may continue until the room is visited by such cleaning person. Moreover, the room will be uncomfortable for a period after occupancy until a guest or hotel personnel can reset the room thermostat.

Accordingly, it is desirable to provide a system for selectively controlling permissible temperature ranges in each of a plurality of such remote zones from a central control location. It is also advantageous to provide a system of such character that it can be installed and placed in operation without having first to provide for the expensive and time consuming installation of conductors, cables or the like between the central facility and zones in which temperature variations are to be controlled. Heretofore, such a possibility has not readily been achievable without the use of so-called dedicated circuits, multiplexing, coding-decoding circuits or a radio remote control, all of which suffer from complexity, great expense, and inconvenience or difficulty of installation.

A related factor which is of concern in determining zone temperature regulation particularly in commercial structures such as hotels, motels and large buildings has to do with the rate at which energy is being consumed. If electrical power is utilized for heating or cooling, it is conventional to purchase such power at rates determined according to a peak demand rate structure. In this regard, it will be understood that if electrical power is used at a rate which is greater than the peak demand, the rate for which such power is purchased from the power utility may be increased substantially or penalties assessed. Such a stepped or penalty imposing rate structure is now or may soon be applicable to other forms of energy purchased for cooling or heating purposes such as gas, oil or steam. If, for example, the use of electrical power approaches the authorized peak demand for a power consumer, it is desirable that steps be taken to limit the amount of electrical power or other forms of energy so utilized or even to cut back on consumption of energy to avoid having to incur the higher rates or penalties associated with exceeding authorized levels of usage.

In addressing the foregoing concerns it is important to keep in mind that a system for conserving energy through selective control of permissible temperature ranges in remote locations must be accomodative of and compatible with a variety of heating and air conditioning systems with different types of units possibly utilized at the various remote zones. To illustrate, a commercial establishment (such as a motel) may utilize a plurality of different kinds of heating and/or cooling systems at various locations. For example, some rooms may have "through-wall," e.g., through-window units, of a self-contained nature in which an independent unit is used for cooling or heating but has no connection with a central system, other than being supplied by AC power. Other rooms may have local fan/coil units interconnected with a central source of heating a cooling fluid such as steam or air but which units are under the control of a room thermostat.

SUMMARY OF THE INVENTION

A primary object of the invention is the provision of a system for selectively controlling permissible temperature ranges in each of a plurality of remote zones from a central control location. A related object of the invention is the provision of such a system for providing selective control of heat transfer in such remote zone from a central location and particularly such a system providing for selective control of heating or cooling in such remote zones from the central location.

A further object is the provision of a system of such character providing for the conservation of energy through control of the permissible temperature range using each of a plurality of remote zones from a central location, and particularly by altering normal operations of heat transfer units at such zones.

A further object of the invention is the provision of a system of the character stated which is functionally operative in its various modes of operation to conserve energy utilized for heat transfer, such as for heating or cooling, with respect to such remote zones.

Another object of the invention is the provision of a system of particular advantage in commercial structures such as hotels, motels, and the like by permitting central selection between primary and secondary temperature ranges in each of a plurality of such remote zones. A related object is the provision of such a system permitting such control selection between primary and secondary temperature ranges where one of such ranges is suitable when a zone is occupied and the other of such ranges is suitable when the zone is unoccupied.

Another related object of the invention is the provision of a system of the character stated which permits occupants of such zones to exercise a degree of control over temperatures in the zone as long as certain temperature limits are not exceeded.

An important further object of the invention is the provision of a system of the character stated which can be installed and placed in operation without having first to require expensive and time consuming installation of conductors, cables or the like between the central location and the remote zones, and particularly such a system which does not require the use of so-called dedicated circuits, multiplexers, encoder-decoders or radio remote control, and which is installed without great inconvenience or difficulty.

Another object of the invention is the provision of a system of the character stated which makes advantageous use of conventional telephone circuits between a central location and remote zones in which permissible temperature ranges are to be selectively controlled, and particularly such a system which is not disruptive and does not interfere in any way with the normal operation of such telephone circuits. A related object is the provision of such a system which optionally permits such telephone circuits to be prevented, if desired, from being used for telephone purposes at certain times, in order to prevent use of the telephone circuit by unauthorized personnel when a zone is unoccupied, and particularly providing such function as an adjunct of selection of a permissible temperature in such remote zone suitable when the zone is unoccupied.

A further object of the invention is the provision of a system of the character stated which is responsive to the rate at which energy is being consumed for heat transfer with respect to such zones, e.g., as in heating or cooling such zones, and particularly such a system which automatically functions to limit the amount of energy or power utilized for heat transfer with respect to a zone for purposes of heating or cooling in order to avoid exceeding authorized levels of usage.

A still further object of the invention is the provision of a system of the character stated which is accommodative of and compatible with a variety of heating and air conditioning systems utilized at different remote zones, such as self-contained heating and cooling units on the one hand, and local fan/coil units tied to a central heating or cooling system, on the other hand; and more particularly, such a system which is utilizable in an establishment having each of such different types of heating and/or cooling systems.

Among additional objects of the invention may be noted that provision of a system of the character stated which is of relatively maintenance free; which does not require failure-prone mechanical elements; which is generally fail-safe in its modes of operation so as to permit normal heating or cooling at remote zones in the event of certain types of system failure even through improbable; which utilizes long lasting and reliable solid state elements; which is flexible in use through provisions for selective enablement of alternative functions; which is modular in nature so as to permit selective addition or removal of optional features in a simple and facile manner; which is relatively simple in design and can readily be understood for the purposes of trouble shooting or maintenance purposes; which utilizes readily available components; and which is simply, easily and economically manufactured.

Briefly, an energy control system of the present invention comprehends selectively controlling remote zone heating or cooling from a central control location through selective control of permissible temperature ranges in each of numerous remote zones from the control location. The system is intended for use where the zones each have a heat transfer unit such as a room heating or air conditioning unit for controlling the temperature in the zone. It is particularly intended for use also where the zones are each interconnected by pairs of conductors, preferably telephone circuits, with the control location typical, for example, of a hotel and motel wherein telephone circuits connect a central switchboard of a private branch exchange (PBX) or private automatic branch exchange (PABX) with the individual rooms or suites.

The system comprises a switching arrangement for selectively controlling voltages on the conductors, as by reversing the polarity of the normal DC energizing voltage which is present across the ring and tip conductors of a telephone circuit. At each such remote zone, a voltage responsive circuit is interconnected with the conductor pair. Heat transfer control switching circuits in each zone are operatively associated with the voltage responsive circuits and rendered operative thereby so as to alter the normal operation of a heat transfer unit in the zone responsive to a detected change of voltage on the conductor pair, such as by shutting off the heat transfer unit, e.g., the heating/cooling apparatus.

The system includes thermostat switches which permit the heating or cooling in such zone when the temperature exceeds predetermined temperature limits which may define a fairly broad temperature range suitable, for example, when the zone is unoccupied.

The heat transfer control switching circuits preferably also include additional thermostat switches which define a more narrow range of temperatures within the zone at which operation of the heat transfer units is also prevented unless the temperature exceeds or falls below the limits of such narrower range which may, for example, be suitable when the zone is occupied.

Although some energy conservation results from precluding heating or cooling operation when zone temperatures are within this narrower range, substantially greater energy conservation results when heating or cooling is precluded for zone temperatures within the broader range.

A selectively utilizable feature of the invention is a circuit for selectively preventing the heat transfer units of the zones from operating in response to a total energy demand signal or the like so as automatically to reduce consumption of electrical power or other forms of energy utilized for heating or cooling when the total levels of usage of such energy for the premises incorporating such a system are about to exceed selected or maximum authorized levels.

Other objects and features of the invention will be apparent. Others will be described hereinbelow.

BRIEF DESCRIPTION OF THE DRAWINGS

Corresponding reference characters indicate corresponding parts throughout the several views of the drawings.

DESCRIPTION OF THE PREFERRED EMBODIMENTS

Figures 1, 2, 8:
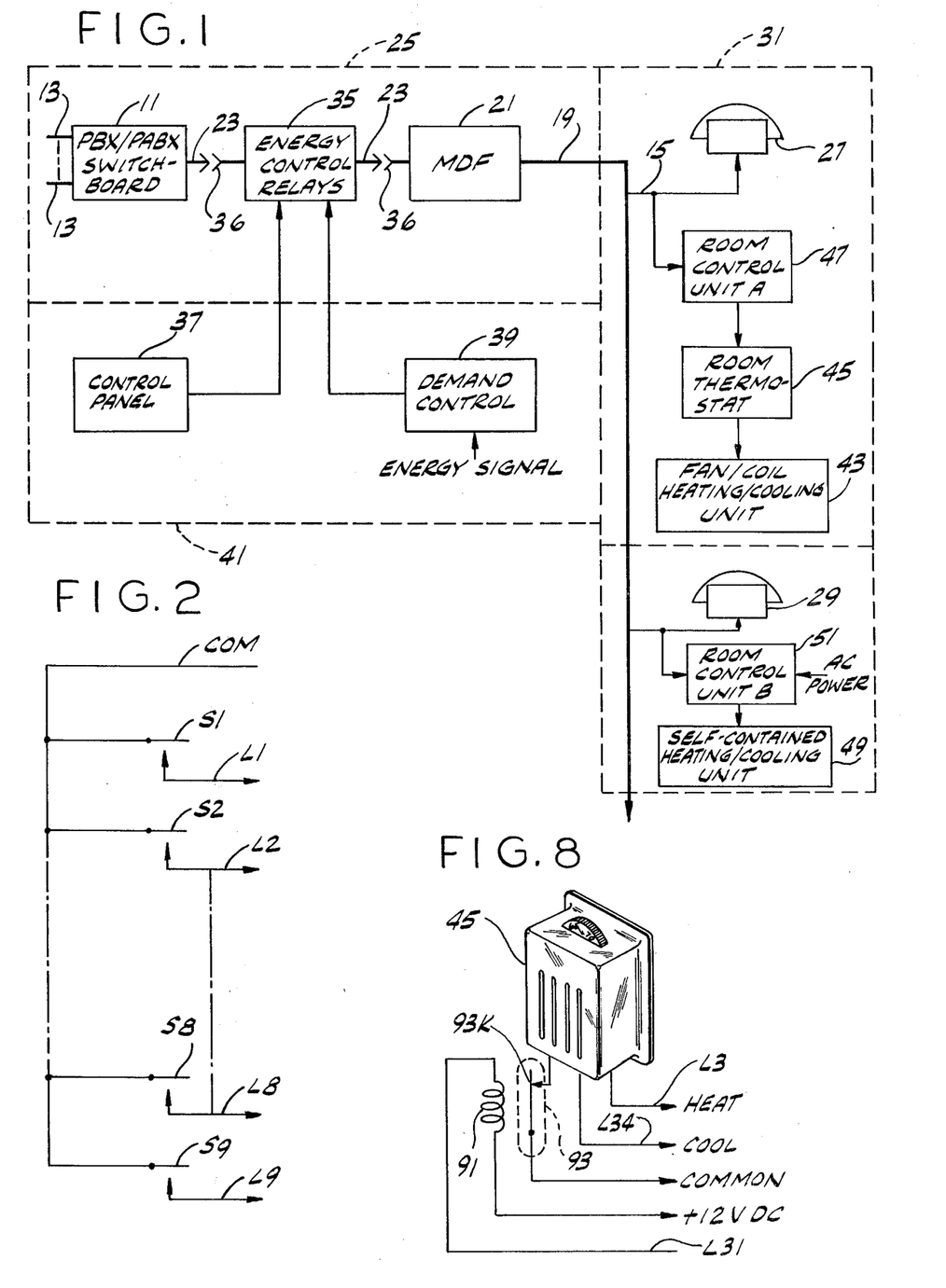
FIG. 1 is a block diagram of an energy control system in accordance with the invention illustrating its general functional interconnection with telephone circuits of a private automatic branch exchange (PABX).
FIG. 2 is a schematic drawing of certain selective switching circuits of the invention associated with a central facility.
FIG. 8 is schematic circuit diagram, including a pictorial representation of a remote unit thermostat control utilizable for effecting control of temperature ranges, for another type of apparatus for heating or cooling at a remote zone.

Referring to FIG. 1 indicated at 11 is a private branch exchange (PBX) or private automatic branch exchange (PABX) central switch board. The switch board may be of the type, for example, which is provided at the premises of a hotel, motel, office building, or other structure. As is known, one or more outside or so-called trunk lines 13 may be selectively connected by switchboard 11 to any of numerous individual private telephone lines such as shown at 15 and 17 which are routed by means of cables, such as that designated 19, via a main distribution frame (MDF) 21 which is interconnected with switchboard 11 by a cable 23. The switchboard also permits interconnection of individual telephone lines such a lines 15 and 17 for routing local calls between telephone sets on the premises. Switchboard 11 is disposed at a central location 25 of the premises, i.e., at a single location which is convenient and appropriate for its intended use.

Each telephone line comprises a conductor pair comprising so-called ring and tip leads which are interconnected with a respective telephone set, such as those shown at 27, 29 at respective zones 31, 33. The locations of the zones are relatively remote from central location 25. There may, of course, be hundreds of such remotely located telephone sets, each being interconnected with MDF 21 and switchboard 11 by a conductor pair having such ring and tip lead. In a hotel, for example, each guest room may have at least one telephone set like that shown at 27, 29.

In accordance with the present invention the contacts of certain relays 35 referred to herein as energy control relays are interconnected with the several telephone conductor pairs of cable 23. Cable connection points are shown at 36 to illustrate schematically the manner in which the contacts of relays 35 are interposed betwen switchboard 11 and MDF 21. These relays 35 operate as polarity switching devices to selectively reverse the polarity of DC energizing voltages which are normally provided across each conductor pair. The relays operate in response to a respective switch of a control panel 37 or in response to the operation of certain demand control circuitry 39 when an energy signal is supplied thereto, all as more fully developed in the following description.

Both control panel 37 and demand control circuitry 39 are positioned at a control location 41 which may be closely adjacent or the same as that of location 25. For example, control panel 37 may be positioned at the front desk or the like of a motel or hotel equipped with a system of the present invention. In such establishments, quite often the telephone switchboard is at or near the front desk.

Zone 31 is shown as having a first type of heating/cooling unit for providing heat transfer with respect to the zone for heating or cooling purposes. Such unit is designated 43 and is representative of the type of unit having a fan and one or more heating and/or cooling coils through which a heating or cooling fluid is circulated for the purposes of heating or cooling zone 31 which unit 43 is associated. In this regard, it will be understood that a source of air or water, either of which may be heated or chilled, as appropriate, may be centrally located or otherwise be remote from zone 31, unit 43 thereby serving merely as a means for transferring heat with respect to the zone. A hotel room, conference room or any of various areas having a controllable heating or cooling unit 43 may, therefore, constitute a remote zone as that expression is used herein.

Interconnected with heating/cooling unit 43 for the purpose of enabling the latter to heat or cool the zone, as appropriate, is a conventional room thermostat 45. Accordingly, unit 43 is responsive to operation of room thermostat 45 dependent upon the set point or setting of the thermostat.

It will be understood that the setting may be controlled, for example, by the room occupant or maybe preset. Accordingly, it will be understood that thermostat 45 is adapted for effecting heat transfer with respect to zone 31 to provide regulation of temperature in such zone over a range preferred by the zone occupant. Thus, the occupant of a hotel room, for example, may select a temperature which such occupant prefers. Heating or cooling by unit 43 under the control of room thermostat 45 then maintains the actual temperature in the room quite close to the selected value, such temperature varying at most by only a few degrees from that selected.

In accordance with the invention, a so-called room control 47 of a first type, referred to herein as type A, is provided in zone 31. Although its specific configuration is discussed below in greater detail, unit 47 generally comprises a voltage responsive circuit for detecting the change in voltage, i.e., voltage polarity reversal of the telephone conductor pair constituted by telephone line 15. For this purpose, unit 47 is interconnected with the telephone line 15.

Control unit 47 includes also heat transfer control switching circuits which are interconnected with the voltage responsive circuitry therein. Such switching circuits are thereby operatively associated with the voltage responsive circuitry so as to alter the normal operation of fan/coil unit 43 by preventing room thermostat 45 from sending a heating or cooling signal to unit 43. In other words, unit 47 is adapted to prevent thermostat 45 from controlling heat transfer in zone 31 in response to the detected change in the voltage relationship, i.e., voltage polarity reversal of the conductor pair comprising telephone line 15.

Room control unit 47 may contain a number of thermostats which delineate the upper and lower limits of two temperature ranges suitable for different conditions of use of zone 31. For example, a narrow range of tempertures may be suitable when the zone is occupied in another and somewhat greater range of temperatures, may be appropriate for use when such zone is unoccupied. Operation is preferably such that the heat transfer control switching circuits of unit 47 preclude operation of unit 43, when a voltage polarity reversal on line 15 is detected, if the temperature in the zone is within a first range of temperatures defined by predetermined first and upper and lower temperature limits, such as 50° F. (10° C.) and 85° F. (29.4° C.), respectively.

At other times unit 47 may desirably operate so as to preclude operation of heat transfer unit 43 if the temperatures within the zone are within a somewhat narrower second range defined by predetermined upper and lower limits such as 65° F. (18.3° C.) and 74° F. (23.3° C.), respectively.

Zone 33 is shown as having a different type of heat transfer unit 49 for heating or cooling purposes, such as a self-contained "through wall" unit which extends through a wall aperture or window or the like and requires only the connection of a source of AC power to function for heating or cooling purposes. It will be understood that unit 49 may conventionally include at least one internal thermostat (not shown) to function in a manner generally equivalent to that of thermostat 45.

Interconnected with heat transfer unit 49 is a room control unit 51 of the present invention. Such unit differs from type 47, being referred to herein as room control type B, in the manner in which it controls heating or cooling. Generally, AC power is shown provided to unit 51, the latter being operative to interrupt such power or to permit such power to be supplied under normal heating or cooling operation of heat transfer unit 49. In this regard, room control unit 51 controls the energization of heat transfer unit 49 and thereby controls its operation in a manner analogous to the manner in which room control unit 47 through interconnection with room thermostat 45 controls the operation of heat transfer unit 43 of zone 31.

Like unit 47, unit 51 contains a switching circuit interconnected with voltage responsive circuitry therein. When voltage polarity reversal is detected by such circuitry, the switching circuit prevents AC power from being provided to heating/cooling unit 49 and thereby prevents its thermostat from effecting heat transfer for either cooling or heating. However, unit 51 contains one or more thermostats which cause the switching circuit to permit AC power to flow through heating/cooling unit 49. Thus, the internal thermostats of unit 51 and related circuitry provide a heat transfer control function permitting operation of heating/cooling unit 49 to operate only if temperatures in zone 33 go beyond a predetermined limit. Operation of unit 49 is precluded in a first broad range of zone temperatures if there is a telephone line polarity reversal for the zone but otherwise precluded only in a second narrow range of temperatures.

Accordingly, whether a zone is equipped with a room control unit of type A or type B, operation of the system is such that when one of the energy control relays 35 reverses the polarity of connection of the conductor pair of a telephone line which connects switchboard 11 with a telephone set located in one of the zones such as those indicated at 27 and 29, and operation of the heating/cooling unit is prevented by the room control unit from providing heat transfer with respect to the zone in which it is located. In other words, either cooling or heating in the zone is precluded upon the reversal of polarity unless the temperature sensed in such zone by the thermostats of the room control unit (e.g., units 47 and 51) go beyond a predetermined upper or lower limit. Such upper and lower limits define a relatively broad range of temperatures permissible in such zones appropriate for use when the zone is unoccupied. Thus, for example, a lower limit of 60° F. may be selected, and an upper limit of, for example, 85° F. may be selected. When there is no reversal of polarity of the telephone line in such zone, the room control unit preferably also precludes operation of the heating/cooling apparatus so long as the zone temperature remains within a more narrow range defined by limits such as 65° F. and 74° F. If the temperature in the zone goes beyond these narrow limits appropriate for occupancy of the zone, the room control unit (e.g., 47 and 51) permits normal operation of the heating/cooling unit such as that indicated at 43 for zone 31 and that indicated at 49 for zone 33.

Referring now to FIG. 2, the switches of control panel 37 are of a normally open SPST type and designated S1-S9, some of the switches not being shown in the interest of simplifying the drawing. Each is adapted to close a circuit between a common lead COM, and a respective one of a plurality of leads L1-L9, which are connected to one input (see FIG. 3) of a plurality of relay drivers G1-G9 which may be regarded as being AND gates in a logic sense, and hence will be so referred to in the following description. Such drivers or gates are of the commercially available type 451 integrated circuit. In operation, the output goes low in response to either input being low. The outputs of gates G1-G9 are respectively designated L11-L19 and are interconnected with one side of respective relays RL1-RL9. The other side of each of the latter relays is connected to an appropriate DC potential $V_R$. Accordingly it will be seen that when any one of switches S1-S9 is closed, the output of an appropriate one of gates G1-G9 goes low to energize its respective relay. To illustrate if switch S9 is closed, lead L19 is interconnected with the circuit common lead COM and causes the output of gate G9 to go low. Hence lead L19 provides a path for the energization of relay RL9.

It will be understood, of course, that there may be many such switches and many such relays, but only nine such sets are illustrated in the drawings in the interest of simplicity and to facilitate understanding of the invention.

Each of the gates G1-G9 has another input adapted to control the output of the respective gate and thereby cause energization of an appropriate one of relays RL1-RL9, but these are explained later. Hence, the remainder of FIG. 3 may be disregarded for the present purposes.

Referring now again to FIG. 4, each of relays RL1-RL9 has a pair of contacts interconnected with the ring and tip leads which comprise a pair of the conductors of each telephone line. For example, line 15 is shown as having a ring lead 15R and a tip lead 15T which are interconnected with normally closed contacts RL1r and RL1t which are operated by relay RL1. Hence, when relay RL1 is energized, the contacts move to a position reversing the polarity of connection of leads 15R and 15T.

As is known, such a telephone line normally provides a potential difference of 48 volts between the ring and tip leads. Thus, if lead 15R is positive with respect to lead 15T, energization of relay RL1 causes the potential difference to be reversed. Accordingly, the extension of lead 15R to the right of relay contact RL1 (such extension being designated 15R') is then negative with respect to its corresponding lead of such pair, 15T'. Similarly, energization of relay RL9 causes relay contacts RL9t and RL9r to reverse polarity of connection of the ring lead 17R and tip lead 17T of telephone line 17. That portion of line 17 which extends to telephone set 29 has its ring lead 17R' is then reversed in potential with respect to tip lead 17T'. Similar contacts are provided for each of relays RL2-RL8 but these are not shown to simplify FIG. 4.

Figure 5:
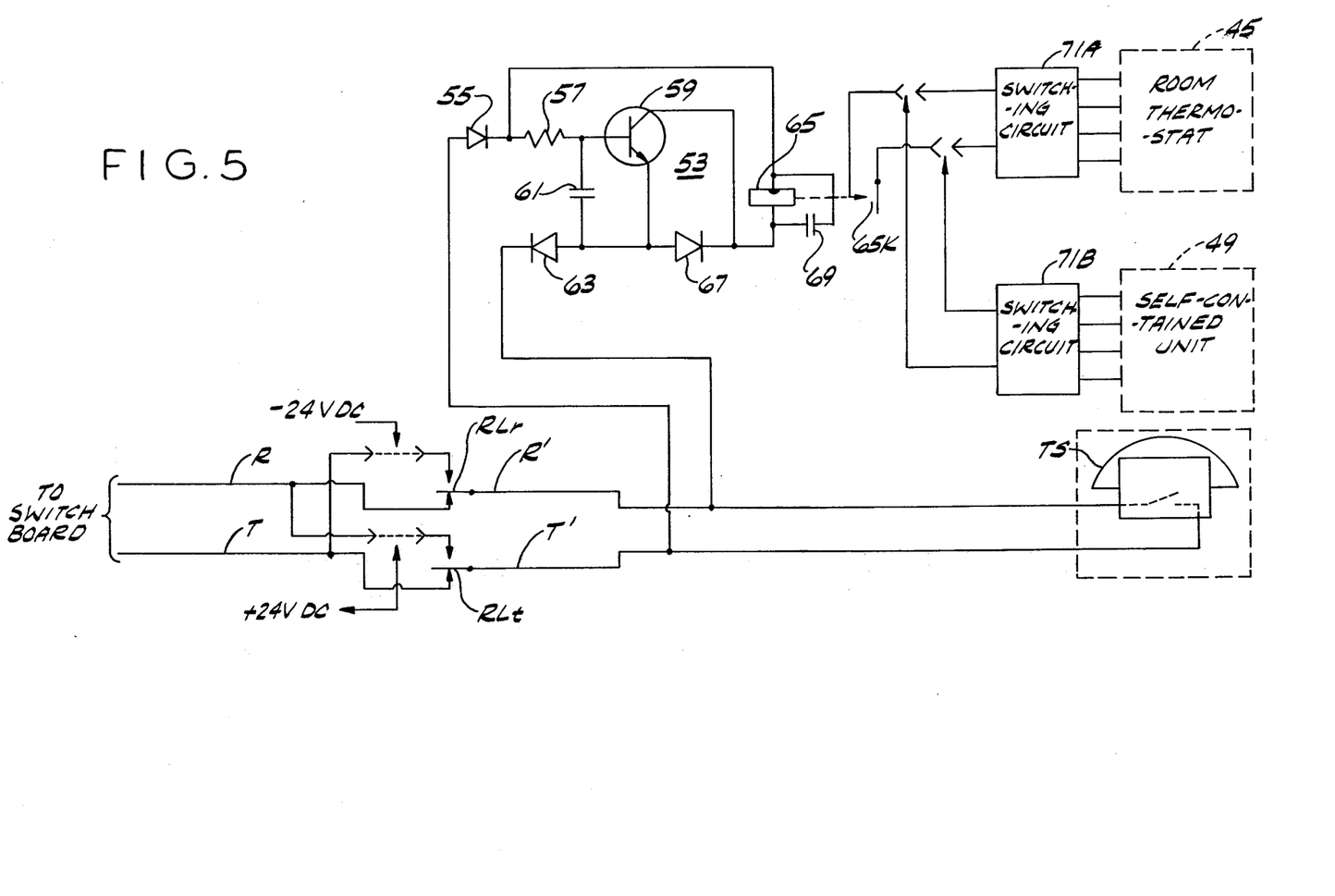
FIG. 5 is a schematic diagram, partly in block-diagrammatic form, of circuitry at a remote location utilized for effecting a change in permissible temperature range in a zone at such location.

Referring to FIG. 5, each remote unit comprises a circuit 53 for detecting reverse polarity connection of the ring and tip leads of the telephone line. A generalized telephone ring lead is designed R and the tip lead T. Telephone line extensions R' and T' extend from relay contacts RLr and RLt representative of the contacts of any one of relays RL1-RL9. Such extensions, of course, extending to a remote zone having a telephone set TS as shown.

Circuit 53 comprises a diode 55 having its cathode connected to the tip lead T' and its anode connected through a resistor to the base of an NPN transistor 59. Connected tween the base of the transistor and its emitter is a capacitor 61. The lower side of capacitor 63 is connected through a further diode 63 to the ring lead R' of the telephone line. Hence, diodes 55 and 63 are polarized for permitting conduction to circuit 54 only when the tip lead T' is positive with respect to the ring lead R'. A relay 65 is connected in a series circuit extending from the collector of transistor 59 and the junction between diode 55 and resistor 57, said circuit including a current limiting resistor 60. A further diode 67 is connected between the collector and emitter terminals with polarity as shown.

Accordingly, when lead R' is positive with respect to lead T' resulting from the operation of relay contacts RLr and RLt, the positive relationship of ring lead extension R' with respect to Tip lead extension T' causes current to flow through diode 55 and resistor 57 for charging capacitor 61. Capacitor 61 is preferably of a sufficiently large value as to provide a delay of a few seconds before the capacitor is charged to a potential sufficient for biasing transistor 59 into conduction. When the transistor conducts, the coil of relay 65 is energized by completing the series circuit through the relay coil. Should the polarity of lead R' with respect to lead T' again be returned to its normal mode, transistor 59 ceases to be conductive and the coil or relay 65 is deenergized. A capacitor 69 across the coil of relay 65, together with diode 67 prevents inductively induced voltage resulting from deenergization of relay 65 from damaging transistor 59.

Before discussing the effect of operation of relay 65 of polarity detection circuit 53, it may be noted that with regard to the 48 volt potential difference between the ring and tip leads of the telephone line, there are two chief conventions as to the relative potential of telephone ring and tip leads. In one convention, the ring lead is normally at a positive 24 volt DC potential and the tip lead is at a negative 24 volt DC potential. In the other convention, the ring lead is at ground potential whereas the tip lead is at a negative 48 volt DC potential.

Figure 4:
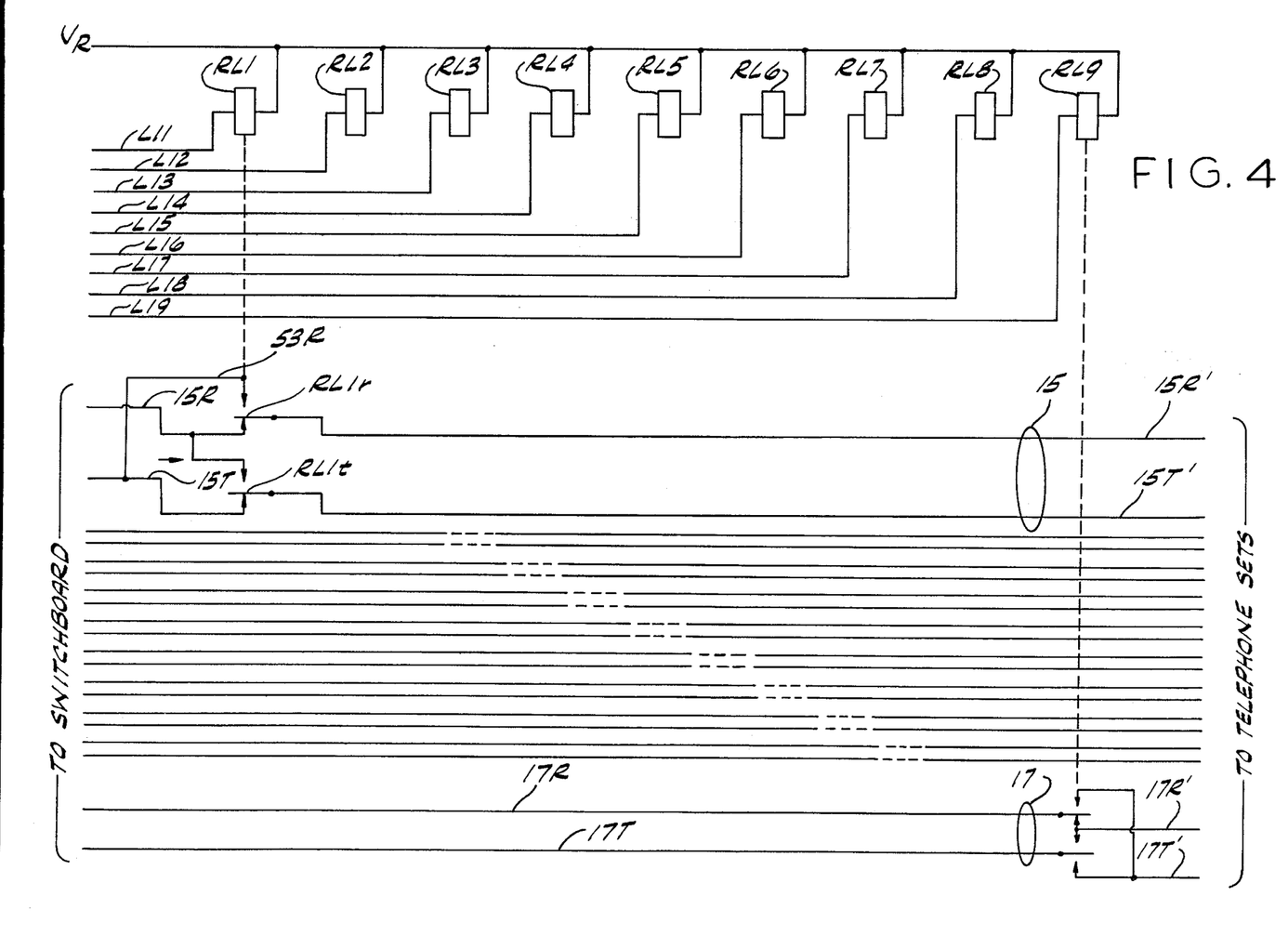
FIG. 4 is a schematic diagram of circuitry including such relays.

With this background, the provision of an additional feature of the invention may be understood. A jack and receptacle arrangement is schematically shown provided adjacent relay contacts RL1r and RL1t. Normally, as illustrated by dashed line representation, tip lead 15T is adapted to be connected by relay contact RL1r to ring lead 15R'. Similarly ring lead 15R is adapted to be connected to tip lead 15T' by relay contact RL1t upon energization of relay RL1. If desired, a source of appropriate DC potential, such as −24 volts DC and +24 volts DC may be connected to receptacles which are shown adjacent relay contacts RL1r and RL1t. If this alternative connection is employed, the operation of relay contacts RL1r and RL1t reverses the polarity of connection of telephone leads 15R' and 15T' by providing to them potential of opposite polarity but at the same time disconnecting them from switchboard 11.

Accordingly, there is provided in this fashion a disconnection of telephone set 27 in zone 31 from switchboard 11 so as to prevent unauthorized personnel in zone 31 from utilizing the telephone set 27 therein, although a reversal of polarity of the potential between the telephone lines connected to the telephone set takes place. In a hotel or motel, or the like, it will be understood in this regard that room cleaning personnel ordinarily would have no need to utilize a telephone. Accordingly, it may in some circumstances be desirable to prevent the use of the telephone set by such personnel in an unoccupied guest room so long as the room remains unoccupied by a guest.

The operation of relay 65 may now be considered. In this regard, polarity detection circuit 53 may be used with either type of heating/cooling unit shown in FIG. 1. Relay 65 includes normally open contacts 65K which are connected with a switching circuit 71A or a switching circuit 71B, depending upon whether the room control unit is to be of type A or type B, respectively.

Figure 6:
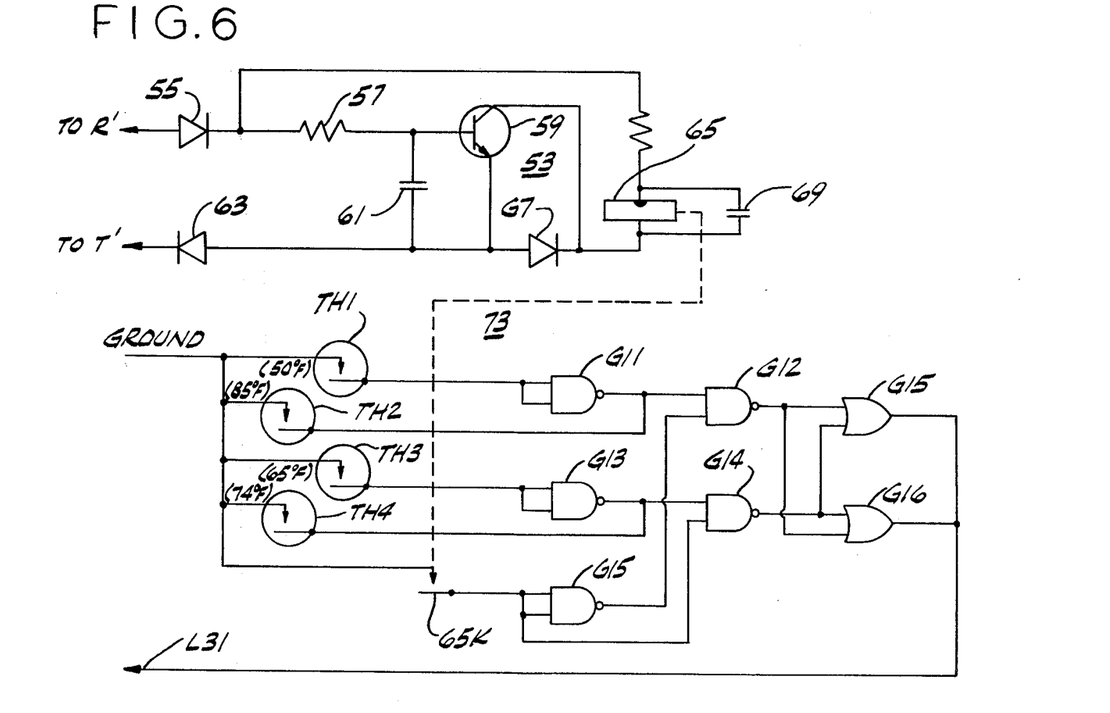
FIG. 6 is a schematic diagram of circuitry illustrated in block form in FIG. 5.

Referring now to FIG. 6, polarity reversal detection circuit 53 is shown interconnected with certain circuitry 73 which is common to both switching circuits 71A and 71B. Circuit 73 comprises thermostat switches ("thermostats") TH1-TH4, each of a normally open type and adapted to close if the temperature rises above a predetermined level for operation of the respective thermostat. For example, TH1 may close at a temperature of 50° F., TH2 may close at 85° F., TH3 may close at 65° F. and TH4 may close at 74° F.

Such operating temperatures define the limits of primary and secondary temperature ranges which are permitted to be maintained in a zone equipped with room control units, type A or B, of the present invention, whether the zone is occupied or unoccupied. For example, if the room is unoccupied it may be desirable to permit the temperature to vary over the range between 50° F. and 85° F. whereas, if it is occupied, it is desired to permit the temperature in such zone to vary only over a more limited, and thus more comfortable range, such as between 65° F. and 74° F.

The ungrounded contact of thermistor TH1 is tied to both inputs of a two-input NAND gate G11. Both the output of the latter and the ungrounded contact of thermistor TH2 are tied together and provided as one input of a further two-input NAND gate G12. Similarly the ungrounded contact of thermistor TH3 is connected to both inputs of a two-input NAND gate G13. The output of the latter and the ungrounded contact of thermostat TH4 are interconnected to provide one input of another two-input NAND gate G14. The circuit ground is connected through relay contacts 65K when the latter close upon energization of relay 69 so as to ground both inputs of a further two-input NAND gate G15, as well as the other input of NAND gate G14. The output of each of NAND gates G12 and G14 is provided to one input of each of a pair of relay drivers or AND gates G15 and G16 of the same types as gates G1-G9. The latter are of the same type as gates G1-G9 of FIG. 3. Accordingly, if either input of gate G15 goes from a low state to a high state the output of the gate is high. If both inputs of such gate are low, the output also is low. Each of the outputs of gates G65 and G66 is connected to a single lead L31.

Figure 7:
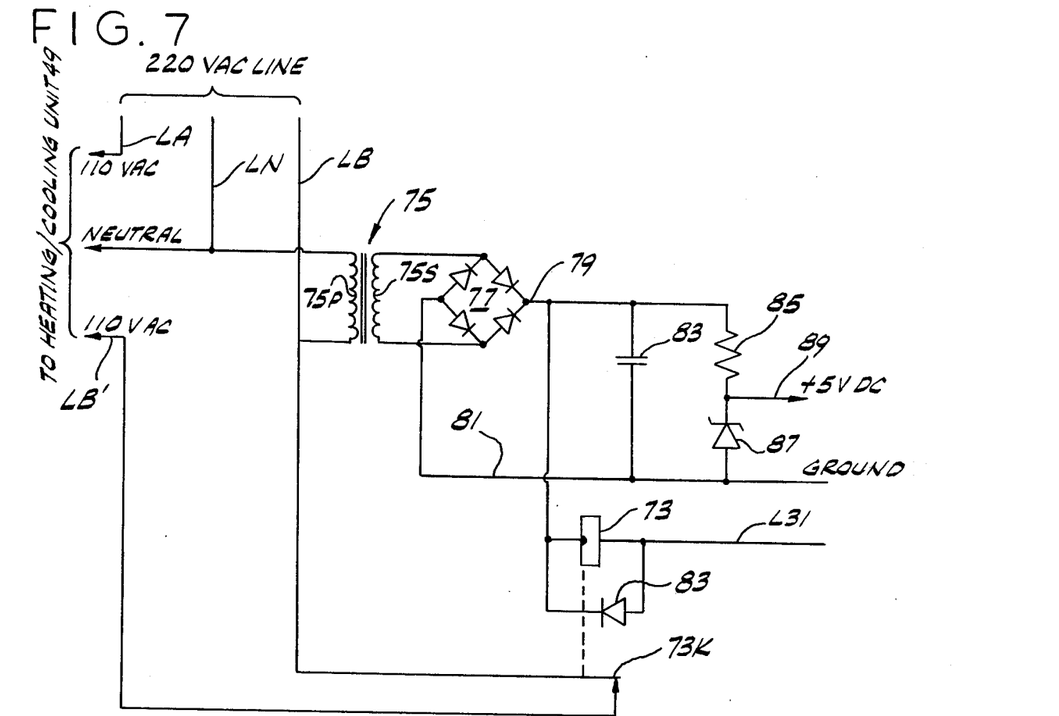
FIG. 7 is a schematic diagram of circuitry utilizable for effecting control over one form of remote zone heating or cooling apparatus.

Lead L31 is connected to either the circuitry of FIG. 7 for providing a room control unit of type A, or is connected to the circuitry of FIG. 8 for providing a room control unit of type B.

Referring to FIG. 7, circuitry is shown for interconnection with lead L11 of circuit 73 (FIG. 6) to provide a room control unit of type B for use when a self-contained heating/cooling unit 49 is to be controlled. Main power leads LA, LN and LB are shown connected to a source of nominally 220 volt single phase AC power, it being understood that each of leads LA and LB is at a potential of nominally 110 volts with respect to the neutral lead LN, the potential between lead LA and LB being nominally 220 volts. Leads LA, LN and LN' are interconnected with heating/cooling unit 49 of the self-contained type, the normally-closed contacts 73K of a relay 73 being interconnected between leads LB and LB' so that 220 volt AC power is normally provided by each of leads LA, LN and LB' to heating/cooling unit 49.

Power for energizing the coil of relay 73 is supplied by a transformer 75 having a primary winding 75P connected across leads LN and LB and a secondary winding 75S across which is connected a full-wave diode bridge rectifier 77. Accordingly, rectified DC potential is provided between output terminals 79 and 81 thereof. One side of the winding of relay 73 is connected between terminal 79 and the other side of such relay is connected to lead L31. A protective diode 83 is connected across the winding of relay 73.

A filter capacitor 83 is connected between terminals 79 and 81 so as to provide filtering of the rectified DC potential provided by bridge rectifier 77. A resistor 85 and zener diode 87 interconnected with the capacitor provide a source of DC potential of suitably reduced magnitude, e.g., 5 volts, between lead 89 and the circuit ground for powering integrated circuits utilized in the circuitry of FIG. 6 and elsewhere in the system.

From the foregoing it will be manifestly clear that if the output of either of gates G15, G16 goes low, lead L31 will provide a path for energizing relay 73 and thereby opening its contacts to interrupt the AC power provided to heating/cooling unit 49.

Referring to FIG. 8, circuitry is shown for interconnection with circuit 73 by means of lead L31 to provide a room control unit of type A for use when fan/coil heating and cooling unit 43 is to be controlled.

Lead L31 is connected to one side of the coil of a winding 91 the other side of which is connected to a source of DC potential such as +12 volts. Such winding 91 controls the operating of a reed relay 93 having normally closed contacts 93K. Accordingly, if the output of either of gates G15, G16 goes low, a path will be provided for energizing relay coil 91 and thereby causing contacts 93K to open. These contacts are connected in series with the common lead of a conventional room thermostat 45. If the circuit through the common lead is open resulting from operation of contacts 93K upon energization of relay 91, thermostat 45 is prevented from supplying either heating or cooling signals via leads L33 and L34 respectively, which are conventionally connected with heating/cooling unit 43. So long as contacts 93K complete the circuit through the common lead, operation of thermostat 45 is such that its contacts close thermostatically at a preset lower temperature limit to provide a heating signal on lead 95. Similarly, thermostat 45 has contacts which close thermostatically at a preset upper temperature limit to provide a signal via lead 97 for energizing cooling apparatus of unit 43.

Figure 3:
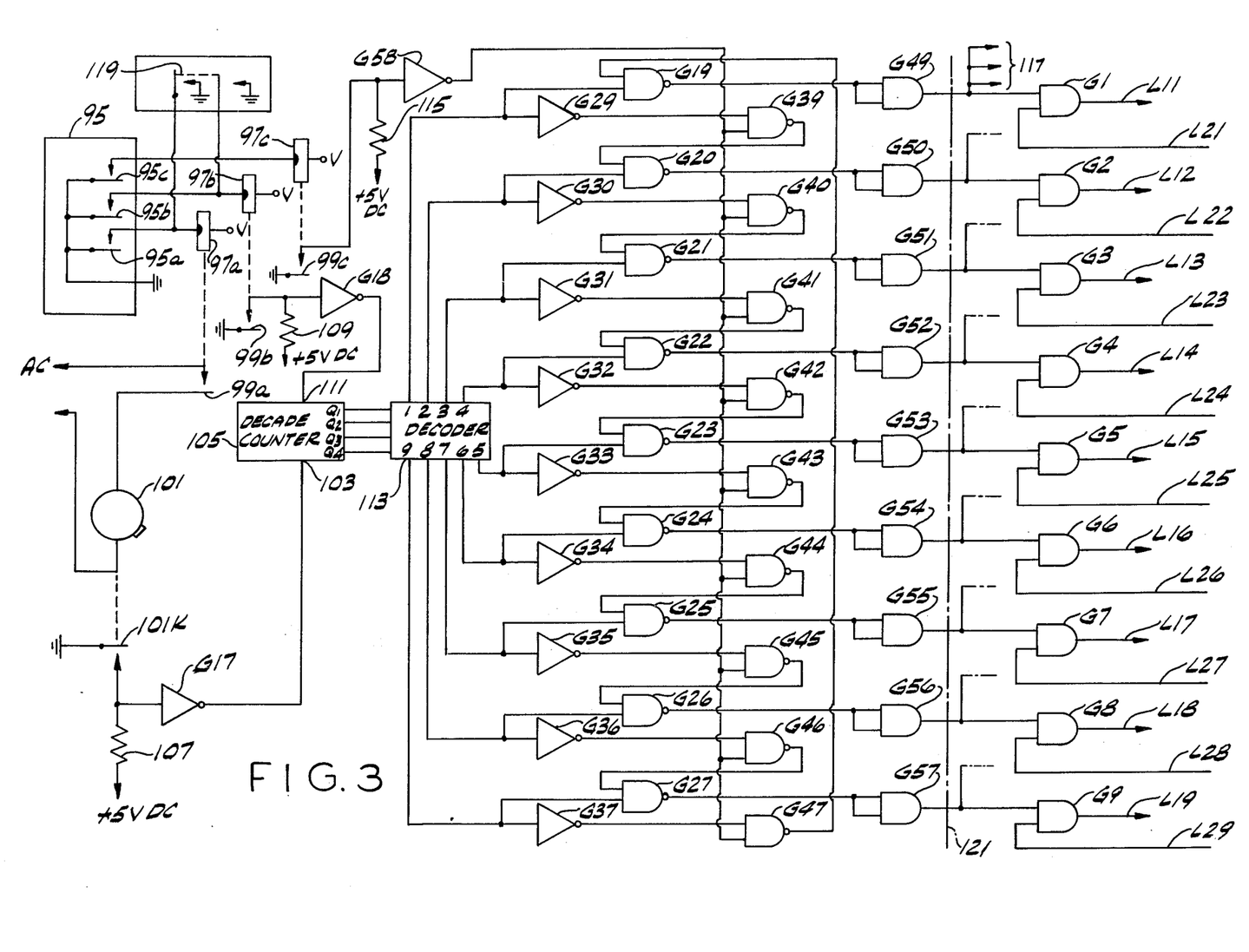
FIG. 3 is a schematic diagram of circuitry associated with an energy demand-responsive control circuit of the invention including certain logic gates utilized for the energization of certain relays which effect a polarity reversing connection of telephone circuit conductor pairs.

Leaving aside those elements of FIG. 3 which have not yet been discussed, operation of the system may now be readily understood. For purposes of illustration, assume that the present system is installed in a hotel or the like having control panel 37 positioned so that its switches may readily be operated by a front desk attendant or other personnel charged with determining whether rooms are occupied or unoccupied.

Normally, none of the relays 35 (such as those designated RL1-RL9 in FIG. 4) is energized. Hence, each telephone circuit of cable 23 is undisturbed and the normal polarity of voltages between the ring and tip leads of a telephone circuit such as that shown at 15 or 17 is undisturbed. Accordingly, each voltage responsive circuit 53 of a room control unit such as units 47 and 51 for detecting a reverse polarity relation ship remains inoperative. To illustrate, normal polarity relationship between the tip leads R′ and T′ as depicted in FIG. 6 does not cause conduction of transistor 59. Relay 65 accordingly remains energized and the contacts 69K remain open.

Under these circumstances, the operation of switching circuit 73 of FIG. 6 may be understood by considering the manner in which thermostats TH1-TH4 affect the several logic gates of this circuit for various temperature conditions.

If it is assumed that the temperature in the zone under consideration is greater than 50° F., thermostat TH1 closes so that both inputs of gate G11 are low. The output thereof, accordingly, is high. If the temperature remains below 65° F., the remaining thermostats TH2, TH3 and TH4 are each open so that the output of gate G13 is low. The output of gate G15 is also low due to the fact that relay contacts 65K are open. Accordingly, one input of gate G12 is high and the other is low so that its output is high. As to gate G14, one input is low (the output of gate G13 being low) and the other input is high because of open relay contacts 65K. Hence, gate G14 has an output which is high. As a result, each of gates G15 and G16 is provided with inputs which are both high, and each of gates G15 and G16 has an output which is high, and consequently so also is lead L31.

If lead L31 is interconnected with the circuit of FIG. 7 so as to provide a room control unit type B, it will be apparent that the coil of relay 73 cannot be energized so long as lead L31 is high and AC power will therefore be supplied to heating/cooling unit 49.

Similarly, if lead L31 is interconnected with the circuit of FIG. 8 to provide a type A room control unit, relay coil 91 cannot be energized if lead L31 is high and relay contacts 93K, therefore, permit normal operation of room thermostat 45 for normal room temperature control of heating/cooling unit 43.

Consider now what happens if the temperature in the controlled zone exceeds 65° F., causing thermostat TH3 to close. This results in gate G13 having an out put which is high and consequently the output of gate G14 goes low. Accordingly, the output of each of gates G15 and G16 drops, causing lead L31 to go low. If lead L31 is connected with the circuit of FIG. 7, relay 73 is energized by the circuit completed in L31 thereby opening contacts 73K to interrupt AC power to the heating-/cooling unit 49 so as to prevent it from heating or cooling. If lead L31 is connected with the circuit in FIG. 8, relay coil 91 is energized by the circuit through lead L31, causing contacts 93K to open for preventing thermostat 45 from demanding heating or cooling by unit 49.

From the foregoing it is now clear that if lead L31 is high, normal operation of the zone heating/cooling apparatus is permitted in a zone equipped with a room control unit 49 or 51 having circuit 73 therein. But if lead L31 is low, normal heating or cooling is prevented. Since heat transfer by the heating or cooling apparatus is then not permitted, energy is conserved.

If the temperature now rises in the controlled zone to a point causing thermostat TH13 to close, i.e., at 74° F., the output of gate G13 is forced low, and the output of gate G14 once more becomes high, causing lead L31 to go high, thereby permitting normal operation of the heating/cooling apparatus in the zone. Consequently, room thermostat 45, for example, of zone 31 may demand cooling (depending upon its setting). Similarly, a zone 33 having a self-contained heating/cooling apparatus 49 may be cooled in response to the internal thermostat of such apparatus 49, depending upon its setting. Temperature in the zone may thus be controlled by the zone occupant and cooling will be permitted so long as the temperature remains at or above the operating temperature (74° F.) of thermostat TH3.

Operation of the room control unit of either type A or type B is thus seen to preclude heating or cooling from taking place so long as the temperature therein remains within a relatively narrow range (65°-74° F.) defined by thermostats TH3 and TH4.

One may then consider operation if one of the switches S1-S9 of control panel 37 is then operated should the room become unoccupied, as where a hotel guest checks out. The switch of control panel 37 corresponding to a room as to which the hotel guest has checked out may then be closed. This closed condition may be referred to as the "checked out" status or position of the switch, the open condition then being referred to as "checked in" status of the respective switch.

When one of switches S1-S9 is so closed, a corresponding one of relays RL1-RL9 is energized. Since this effectively reverses the polarity of the ring and tip leads R′ and T′ of the telephone line extension interconnected with the room or zone corresponding to such switch, the reversed polarity relationship will be served by voltage-responsive circuit 53 in that zone, causing relay contacts 65K (FIG. 6) to close. As will be understood from the foregoing description of circuit 73 and its several logic gates, the result will be that any temperature in the zone greater than the operating temperature (50° F.) of thermostat TH1 but less than the operating temperature (85° F.) of thermostat TH2 always causes lead L31 to be low. Consequently, for such temperatures lead L31 completes the circuit for energization of the respective relay coil 73 or 91 of FIG. 7 or 8, respectively.

However, if the temperature in the zone drops below 50° F., thermostat TH1 opens, causing lead L31 to go high. Similarly, if the temperature rises to 85° F. or higher, resulting in closing thermostat TH2, lead L11 becomes high. Under either circumstance, the heating-/cooling apparatus in the controlled zone once more may operate to prevent the temperature in such zone from falling too low or becoming too great. Hence, thermostats TH1 and TH2 define the limits of a wider primary temperature range for which heating or cooling is precluded. When temperatures are permitted to vary over this greater range of 50°-85° F., far less energy is used than would be required if the temperatures were permitted to vary only over the narrower secondary range of 65°–74° F. previously described.

Although the operating temperatures of thermostats TH1–TH4 described above have been found to be desirable, it is within the purview of the present invention that quite different operating temperatures of the thermostats may be selected. For example, the operating temperatures of thermostats TH3 and TH4 may be made much closer or selected at substantially the same value. Thus, in the latter event, circuit 73 would not interrupt normal heating or cooling unless the telephone ring and tip lead polarity were reversed selectively by operation of a switch of panel 37.

A fail-safe mode is provided by the system in that should there be a failure of one of the relay 35 (e.g., relay RL1–RL9 in FIG. 4), the heating/cooling apparatus of each zone may return to operation so as to permit variation in temperature only within a narrow range. In addition, heating or cooling is disabled only so long as the coil of relay 73 (FIG. 7) or relay coil 91 (FIG. 8) remains energized. Accordingly, any failure of any of such relays permits normal heating or cooling at remote zones to be resumed.

Referring now to FIG. 3 circuitry of demand control 39 is shown for causing selective operation of the energy control relays 35 (FIG. 1) such as those indicated at RL1–RL9 in FIG. 4, in response to an energy demand signal. Such signal may be provided by an energy monitor power demand meter 95 of commercially available type or of a construction provided by an electrical or other energy-supplying utility company.

Monitor or meter 95 has a plurality of switch contacts 95a, 95b and 95c adapted automatically to close in sequence in response to increasing levels of total usage of electrical power or other forms of energy being supplied to premises having a system of the present invention. For example, contacts 95a, 95b and 95c may close at preselected values of 85%, 90% and 95%, respectively, of a predetermined maximum power level or energy demand, where 100% may represent the authorized peak demand for use on such premises, for example, or another predetermined power or energy maximum.

As electrical power is used, for example, on the premises for purposes of lighting, heating or cooling, it will be understood that the increased operation of heating/cooling units of the type shown at 43 and 49 (FIG. 1) during environmental temperature extremes will require increased total electrical power consumption on the premises.

The circuitry of FIG. 3 is intended to prevent such increased consumption from reaching said predetermined maximum energy level by automatically selectively disabling the heating/cooling units in the zones of the premises which are equipped with control units of the type shown in FIG. 1 at 47 and 51.

Each of meter switches 95a, 95b, 95c has one side grounded and the other side interconnected with a respective relay coil 97a, 97b, 97c. Voltage of an appropriate level V is supplied to each such coil so that closure of any of the switches energizes a respective relay coil. Each relay coil operates a respective set of normally open contacts 99a, 99b, 99c. Contacts 99a are interconnected in a series circuit with a timer motor 101 for energizing said motor from a suitable AC source. Motor 101 is adapted to effect momentary closure of a set of normally open contacts 101K at the end of a predetermined period, such as five minutes. When meter contacts 95a close as energy demand reaches 85% of the maximum, timer motor begins operation. Each timer contacts 101K close, a logic inverter gate G17 interconnected with these contacts supplies a pulse to the clock pulse input 103 of a binary-coded decade counter 105. In this regard, a voltage of +5 VDC is supplied through a resistor 107 to the input of gate G17 and, as a result, the output thereof is low except when its output is grounded by momentary closure of contacts 101K.

Relay contacts 99b are similarly interconnected with another logic inverter gate G18 having a voltage of +5 VDC supplied through a resistor 109 to its input so as to ground such input when contacts 99b close. The output of gate G18 is connected to a count disable/enable counter 105, such input 111 if low, preventing counter 105 from counting the clock pulses supplied to input 103. Upon closure of contacts 99b in response to the power demand reaching 90% of the maximum, the output of gate G18 goes high, thus permitting counter 103 to begin counting. The binary coded count is provided via outputs $Q_1$, $Q_2$, $Q_3$ and $Q_4$ of counter 103.

Accordingly, circuitry is provided for supplying a plurality of energy demand signals from said energy monitor or meter 95 corresponding to preselected discrete percentages (85%, 90%, 95%) of a maximum (100%) energy demand. Demand control circuitry which is responsive to such signals includes counter 103 and further decoding and logic circuits as follows:

Interconnected with these outputs is a binary-to-decimal one-out-of-ten decoder 113. Such counter is shown as having nine of its outputs interconnected with logic gates. These outputs, normally high, sequentially go low in response to the binary-coded signals provided by counter 105.

More specifically, decoded decimal outputs of decoder 113 are respectively connected as indicated to one input of each of a plurality of NAND gates G19–G27. They are also connected through respective logic inverter gates G29–G37 to one input of respective NAND gates G39–G47. The output of each of such gates G39–G46 are each interconnected with the other input of a respective one of NAND gates G20–G27, the output of gate G47 being interconnected with the remaining input of gate G19.

Respectively interconnected with the output of each of NAND gates G19–G27 are both inputs of AND gates G49–G57. The latter gates, in this sense, serve as logic inverter gates. The outputs of the latter AND gates serve as a respective one of the input to each of the previously described and gates G1–G9.

The remaining inputs of NAND gates G39–G47 are tied together and connected to the output of another logic inverter gate G58 having an input provided with +5 VDC through resistor 115 and also interconnected with relay contacts 99c. Hence, the output of a gate G58 is normally low but becomes high resulting from grounding of the input of closure of contacts 99c occurring if the energy demand reaches 95% of the predetermined maximum.

Since it will be understood that there may be relay driver gates like gates G1–G9 for each zone in which heating or cooling is to be controlled, there may be many more such gates than shown. If so, a plurality of such gates (up to twenty) may similarly be interconnected with each of AND gates G49–G57. Circuit connections to such additional gates are represented at 117.

Operation of the above described apparatus is as follows: Briefly, timer 101, counter 103, decoder 113, and the various logic gates controlled by decoded outputs of the decoder constitute means for sequentially disabling heating/cooling apparatus, in respective zones or blocks of zones for predetermined time intervals by, in effect, providing a count in counter 103 signifying a zone or block of zones in which heating or cooling is to be prevented by disabling the heating/cooling apparatus therein and then decoding such count, and using the decoded signal to control the energy control relays 35 (FIG. 1).

More specifically, when an energy demand of 90% of the predetermined maximum is reached, contacts 95b close. Accordingly, a high condition is provided at input of counter 105. The latter begins counting in response to pulses at input 103. The decoder 113 decodes the resultant binary-coded count of counter 105 and thus provides decimal outputs one through nine which go low in sequence. Taking the decimal "one" output as an example, such output goes low on the first pulse supplied to counter 103. When such output is low, the output of inverter gate G29 is high. Accordingly, NAND gate G39 is provided with one high and one low input since the output of gate G58 remains low, of course, until energy demand reaches 95%. The output of gate G39 is, therefore, high.

The other input for gate G19 is provided by the output of NAND gate G47. Since both inputs of the latter are low, its output is high. Hence, gate G19 has one input high, the other low. Its output accordingly becomes low. As a result, the polarity-reversing relay RL1 which is interconnected with this gate is energized causing reversal of the polarity between telephone circuit ring and tip leads 15R', 15T'. Hence the heating/cooling unit in a zone having a control unit (such as indicated at 47 or 51) responsive to this polarity reversal will be disabled. In addition, other polarity-reversing relays controlled, as explained, by similar gates (like G1–G9) connected at 117 will also be energized. Thus, heating/cooling apparatus in several zones will be disabled for the period in which decode counter 105 maintains its count. As noted, timer contacts 101K close at five minute intervals, so that counter 105 maintains each count for that period. Longer or shorter counting intervals may, of course, be used.

When counter 105 changes to its next count, the output of AND gate G49 returns to its high state. Relay RL1 and similar relays controlled by gate connections at 117 will, therefore, be deenergized, permitting the zone heating/cooling units controlled by such relays to resume normal operation.

Such periodic changes in the count of counter 105 cause the respective outputs of gates G49–G57 to drop in sequence, thereby causing the heating/cooling apparatus of only a preselected zone or group of zones at any one time to be switched to an energy conserving mode of operation. This precludes such units from effecting heat transfer with respect to these zones unless, of course, the temperature therein should become so extreme that thermostats TH1 (which operates at 50° F.) or TH2 (which operates at 85° F.) permit the heating/cooling apparatus to operate as previously described.

The result of such disabling of heating or cooling of preselected rooms in sequence for relatively short periods may significantly reduce consumption of energy, so that meter contacts 95b will be likely to open. Should this occur, input 111 of counter 105 will drop low, causing the counter to reset. Further reduction of power demand will be likely to cause meter contacts 95a to open.

If power demand for heating or cooling rises, however, so much that contacts 95c should close, then relay contacts 99c will close, causing gate G58 to provide a high input to each of gates G39–G47. If this occurs, successive counting by counter 105 will result in pairs of the AND gates G49–G57 having outputs low simultaneously. As a result, twice as many zones at a time will have their heating/cooling apparatus disabled, so as to cut back even more greatly on the consumption of power.

If it is desired to manually effect operation of the FIG. 3 demand control circuitry, a switch 119 may be moved from the position shown. Accordingly, relays 97a and 97b will both be energized, irrespective of the operation of power demand meter 95.

Switch 119 may be present on control panel 37, permitting hotel management personnel for example, manually to cause selective cyclic disablement of heating or cooling in zones of the hotel. It is noted that, whether operation of the demand control circuitry of FIG. 3 is manually implemented or automatically initiated by power demand meter 95, it does not preclude selectively controlling heating or cooling preselected zones through operation of one of the switches of control panel 37 so as to permit temperature variation in such zones over a broad energy-conserving range.

Also, it will be appreciated that the demand control circuitry of FIG. 3 may be optionally included or omitted from the present system by simply breaking the interconnections with outputs of gates G49–G57 along a line designated 121, such as through use of an appropriate plug and receptacle arrangement. To this extent the system is modular in nature.

The various circuits and logic devices described with respect to the several figures of drawings may advantageously comprise monolithic integrated circuits. For example, the following table indicates commercially available types of integrated circuits (IC's) which may be utilized for various logic gates of the system.

| Gates | IC Type |
| --- | --- |
| G1–G9 | 451 |
| G11–G14 | 946 |
| G15–G16 | 451 |
| G19–G27 | 946 |
| G29–G37 | 936 |
| G39–G47 | 946 |
| G49–G57 | 957 |

While integrated circuits of discrete commercial types may be employed, it will be apparent that circuitry as described herein may be of the large scale integration (LSI) type.

In view of the foregoing, it will be seen that the several objects of the invention are achieved and other advantages are attained.

The specific embodiments described or shown herein are intended to be illustrative, the scope of the invention being indicated by the following claims wherein all variations within the range of equivalence are intended to be encompassed.

What is claimed is:

1. An energy control system for selectively controlling permissible temperatures in a plurality of remote zones from a control location, said zones each having heat transfer means normally operational for effecting heat transfer with respect to said zone to control temperature in said zone, said zones each being interconnected with said control location by respective telephone circuits each comprising ring and tip conductors constituting a conductor pair having a DC telephone operating voltage normally imposed thereon of a normal polarity, said system comprising polarity reversing means for effecting a reversal of said normal polarity, said polarity reversing means comprising polarity switching means interconnected with each said conductor pair for selectively reversing the polarity of connection of such conductor pair to said DC telephone operating voltage, voltage responsive means in each zone responsive to reversal of polarity of said DC voltage imposed on a conductor pair interconnecting said zone with said control location, heat transfer control means in each zone, operatively associated with said voltage responsive means in said zone, for altering normal operation of said heat transfer control means for as long as there is maintained a reversal in the polarity of the voltage on said conductor pair, in a sense tending to require less enerby for heat transfer with respect to said zone, said polarity reversing means and said voltage responsive means each operating independently of any telephone voice communication signals carried by said conductor pair without interruption by voice communication signals.

2. An energy control system as defined in claim 1 and further characterized by said polarity switching means being constituted by a relay having relay contacts, said contacts being operative to reverse the polarity of connection of such conductor pair to a DC energizing voltage dependent upon energization of said relay.

3. An energy control system as defined in claim 1 and further characterized by said relay contacts being adapted optionally for selectively preventing voice communications over said conductor pair in responsive to energization of said relay.

4. An energy control system as defined in claim 1 and further characterized by said heat transfer control means being adapted to prevent operation of said heat transfer means in response to said change in voltage on said conductor means.

5. An energy control system as defined in claim 1 and further characterized by said heat transfer means of each zone including at least one thermostat means adapted when normally operational for controlling heat transfer in said zone.

6. An energy control system as defined in claim 5 and further characterized by said heat transfer control means in each zone being adapted to prevent said thermostat means from controlling heat transfer in said zone in response to a change in voltage on said conductor means.

7. An energy control system as defined in claim 5 and further characterized by said heat transfer control means comprising a switching circuit, operatively associated with said voltage responsive means circuit, and interconnected with said heat transfer means.

8. An energy control system as defined in claim 7 and further characterized by said switching circuit being interconnected with said thermostat means for disabling operation thereof in response to a change in voltage caused by said voltage responsive circuit.

9. An energy control system as defined in claim 7 and further characterized by said switching circuits being interconnected between a source of AC power for said heat transfer means and said heat transfer means for preventing said AC power from being supplied to said heat transfer means in response to a change in voltage caused by said voltage responsive circuit.

10. An energy control system as defined in claim 4 and further characterized by said heat transfer control means being adapted to prevent operation of said heat transfer means, in response to said change in voltage, only when the temperature in said zone is within a predetermined limit but permitting operation of said heat transfer means if the temperature in said zone goes beyond said predetermined limit.

11. An energy control system as defined in claim 10 and further characterized by said heat transfer control means being adapted to prevent operation of said heat transfer means, in response to said change in voltage, only when the temperature in said zone is within a first range of temperatures defined by a predetermined first upper temperature limit and by a predetermined first lower temperature limit.

12. An energy control system as defined in claim 11 and further characterized by said heat transfer control means comprising first thermostat means for sensing the temperature in said zone, said first thermostat means comprising a pair of thermostat switches respectively operative at said first upper and first lower temperature limits.

13. An energy control system as defined in claim 11 and further characterized by said heat transfer control means being adapted to prevent operation of said heat transfer means at all times, except in response to a change in the polarity of said voltage of said conductor pair, when the temperature in said zone is within a second range of temperatures defined by a second upper temperature limit and a second lower temperature limit, said second range of temperatures being less than said first range of temperatures.

14. An energy control system as defined in claim 1 wherein the total use of energy for said transfer of heat with respect to said zones is centrally monitored by energy monitoring means, said system being further characterized by means for supplying an energy demand signal responsive to said energy monitoring means which signal is indicative of said centrally monitored energy reaching a first preselected value and demand control means responsive to said energy demand signal for causing said heat transfer control means in said zones to alter normal operation of said heat transfer means in said zones in a sense tending to require less energy for heat transfer with respect to said zones whereby to reduce said total use of energy.

15. An energy control system as defined in claim 14 and further characterized by said demand control means being operative in response to said energy demand signal to sequentially cause said heat transfer means in respective zones to alter normal operation of heat transfer means in such zones.

16. An energy control system as defined in claim 15 and further characterized by said heat transfer control means being adapted to prevent operation of said heat transfer means in response to said change in voltage on said conductor means.

17. An energy control system as set forth in claim 15 and further characterized by said demand control means being operative in response to said energy demand signal to cause said heat transfer means in respective zones to alter normal operation of heat transfer means in such zones for predetermined time intervals.

18. An energy control system as set forth in claim 17 and further characterized by said demand control means comprising a timer, means for sequential switching in response to said timer, said telephone circuits connecting said sequential switching means with said means for selectively controlling voltages imposed on said conductors for causing the last said means to sequentially control voltages on respective conductor pairs.

19. An energy control system as defined in claim 18 and further characterized by said sequential switching means comprising a counter and switching circuits functionally interconnected with said counter, said switching circuits being interconnected with said means for selectively controlling voltages.

20. An energy control system as defined in claim 19 and further characterized by said counter being a binary counter, said switching circuits comprising a decoder for decoding the count in said binary counter.

21. An energy control system as defined in claim 20 and further characterized by said means for selectively controlling voltages comprising a plurality of relays interconnected with said conductor means, said switching circuits comprising a plurality of logic gates interconnecting said decoder with said relays, whereby energization of said relays is sequentially controlled.

22. An energy control system as defined in claim 21 and further characterized by means for supplying a further energy demand signal responsive to said energy monitoring means which signal is indicative of said centrally monitored energy, reaching a second preselected value, said switching circuits including logic gates responsive to said further energy demand signal for causing energization of additional numbers of said relays to be sequentially controlled, thereby to additionally reduce said total use of energy.

23. An energy control system as defined in claim 15 and further characterized by means for manually causing said demand control means to sequentially cause said heat transfer means in respective zones to alter normal operation of heat transfer means in such zones.

* * * * *